United States Patent
Wu et al.

(10) Patent No.: US 6,860,930 B2
(45) Date of Patent: Mar. 1, 2005

(54) PHASE CHANGE INKS CONTAINING BRANCHED TRIAMIDES

(75) Inventors: Bo Wu, Wilsonville, OR (US); Jeffery H. Banning, Hillsboro, OR (US); Donald R. Titterington, Newberg, OR (US); C. Wayne Jaeger, Beaverton, OR (US)

(73) Assignee: Xerox Corporation, Stamford, CT (US)

( * ) Notice: Subject to any disclaimer, the term of this patent is extended or adjusted under 35 U.S.C. 154(b) by 157 days.

(21) Appl. No.: 10/606,099

(22) Filed: Jun. 25, 2003

(65) Prior Publication Data

US 2004/0261656 A1 Dec. 30, 2004

(51) Int. Cl.$^7$ .............................................. C09D 11/00
(52) U.S. Cl. ........................... 106/31.29; 106/31.61; 106/31.43; 106/31.75
(58) Field of Search ..................... 106/31.29, 31.61, 106/31.43, 31.75

(56) References Cited

U.S. PATENT DOCUMENTS

| | | | |
|---|---|---|---|
| 3,253,940 A | 5/1966 | Floyd et al. ................ 106/316 |
| 3,622,604 A | 11/1971 | Drawert et al. .......... 260/404.5 |
| 3,653,932 A | 4/1972 | Berry et al. .................. 106/22 |
| 4,066,585 A | 1/1978 | Schepp et al. ................ 260/18 |
| 4,390,369 A | 6/1983 | Merritt et al. ................ 106/31 |
| 4,484,948 A | 11/1984 | Merritt et al. ................ 106/31 |
| 4,684,956 A | 8/1987 | Ball ........................... 346/1.1 |
| 4,830,671 A | 5/1989 | Frihart et al. ................ 106/27 |
| 4,851,045 A | 7/1989 | Taniguchi .................... 106/31 |
| 4,889,560 A | 12/1989 | Jaeger et al. ................ 106/27 |
| 4,889,761 A | 12/1989 | Titterington et al. ........ 428/195 |
| 4,895,982 A | 1/1990 | Pavlin et al. ................ 562/595 |
| 5,006,170 A | 4/1991 | Schwarz et al. .............. 106/20 |
| 5,151,120 A | 9/1992 | You et al. .................... 106/27 |
| 5,194,638 A | 3/1993 | Frihart et al. ................ 554/47 |
| 5,221,335 A | 6/1993 | Williams et al. .............. 106/23 |
| 5,372,852 A | 12/1994 | Titterington et al. ........ 427/288 |
| 5,496,879 A | 3/1996 | Griebel et al. .............. 524/320 |
| 5,510,821 A | 4/1996 | Jones et al. .................... 347/88 |
| 5,597,856 A | 1/1997 | Yu et al. ..................... 524/227 |
| 5,621,022 A | 4/1997 | Jaeger et al. ................ 523/161 |
| 5,645,632 A | 7/1997 | Pavlin ........................ 106/31.29 |
| 5,777,023 A | 7/1998 | Pavlin ........................ 524/590 |
| 5,863,319 A | 1/1999 | Baker et al. ............. 106/31.29 |
| 5,988,805 A | 11/1999 | Meinhardt .................... 347/88 |
| 6,133,353 A | 10/2000 | Bui et al. .................... 524/198 |
| 6,174,937 B1 | 1/2001 | Banning et al. ............. 523/160 |
| 6,528,613 B1 | 3/2003 | Bui et al. .................... 528/288 |

FOREIGN PATENT DOCUMENTS

| | | |
|---|---|---|
| EP | 0 187 352 | 7/1986 |
| EP | 0 206 286 | 12/1986 |
| GB | 2 238 792 | 6/1991 |
| WO | WO 94/04619 | 3/1994 |

OTHER PUBLICATIONS

English abstract for German Patent Publication DE 4205636AL.
English abstract for German Patent Publication DE 4205713AL.

*Primary Examiner*—Mark L. Bell
*Assistant Examiner*—Veronica F. Faison
(74) *Attorney, Agent, or Firm*—Judith L. Byorick

(57) ABSTRACT

Disclosed is a phase change ink composition comprising (a) a colorant and (b) a carrier comprising a polyamide, wherein the polyamide component of the carrier contains at least about 10 percent by weight of a branched triamide.

48 Claims, No Drawings

PHASE CHANGE INKS CONTAINING BRANCHED TRIAMIDES

BACKGROUND OF THE INVENTION

The present invention is directed to hot melt or phase change inks. More specifically, the present invention is directed to phase change inks particularly suitable for use in phase change ink jet printers. One embodiment of the present invention is directed to a phase change ink composition comprising (a) a colorant and (b) a carrier comprising a polyamide, wherein the polyamide component of the carrier contains at least about 10 percent by weight of a branched triamide. Another embodiment of the present invention is directed to a phase change ink composition comprising (a) a colorant and (b) a phase change ink carrier comprising a polyamide, wherein the polyamide component of the carrier contains at least about 10 percent by weight of a branched triamide which is the reaction product of either (i) a mixture consisting essentially of at least one monoacid, at least one branched triamine, and optional ingredients nonreactive with the monoacid, the triamine, and the reaction product thereof, or (ii) a mixture consisting essentially of at least one monoamine, at least one branched triacid, and optional ingredients nonreactive with the triacid, the monoamine, and the reaction product thereof. Yet another embodiment of the present invention is directed to a phase change ink composition comprising (a) a colorant and (b) a phase change ink carrier comprising a polyamide, wherein the polyamide component of the carrier contains at least about 10 percent by weight of a branched triamide which is the reaction product of either (i) a mixture comprising at least one branched triamine and at least one monoacid present in an amount of at least about 3 moles of monoacid per every one mole of branched triamine, or (b) a mixture comprising at least one branched triacid and at least one monoamine present in an amount of at least about 2.5 moles of monoamine per every one mole of branched triacid.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite block can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 4,830,671 (Frihart et al.), the disclosure of which is totally incorporated herein by reference, discloses an ink composition having the properties of stability and uniformity of performance under ink jet printing conditions and desired printing properties which can be obtained with hot melt ink compositions consisting of a resinous binder comprised of a compound of the formula

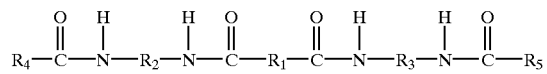

wherein $R_1$ represents a polymerized fatty acid residue with two carboxylic acid groups removed, $R_2$ and $R_3$ are the same or different and each represent an alkylene with up to 12 carbon atoms, a cycloalkylene with 6 to 12 carbon atoms, an arylene with 6 to 12 carbon atoms, or an alkarylene with 7 to 12 carbon atoms, and $R_4$ and $R_5$ are the same or different and each represents an alkyl having up to 36 carbon atoms, a cycloalkyl having up to 36 carbon atoms and aryl having up to 36 carbon atoms, or an alkaryl having up to 36 carbon atoms, said resinous binder having a melt viscosity of less than 250 CPS at 50° C. and a colorant distributed through the resinous binder in an effective amount sufficient to impart a predetermined color to the resulting hot melt ink composition.

U.S. Pat. No. 5,194,638 (Frihart et al.), the disclosure of which is totally incorporated herein by reference, discloses a resinous binder for use in hot melt ink compositions, which ink compositions may be used in hot melt ink jet printing applications. The resinous binder has a melt viscosity of 250 cps or less at 150° C., is sufficiently transparent to allow a colorant to be distributed through the resinous binder in an amount effective to import a pre-determined color to the resulting hot melt ink composition, and has a blocking temperature greater than 100° C.

U.S. Pat. No. 5,645,632 (Pavlin), the disclosure of which is totally incorporated herein by reference, discloses solid diesters for hot-melt inks which are prepared by reaction of polymerized fatty acid with long chain primary monohydric alcohols, optionally in the presence of diamine. The long chain alcohols have at least about 20 carbon atoms, and preferably have 24 or more carbon atoms. The esterification of liquid polymerized fatty acid with monohydric alcohol provides a diester that is solid at room temperature and has a melting point of less than about 150° C. The diester can be formulated with colorants and/or other image-producing materials to provide an ink for hot-melt printing, e.g., hot-melt ink jet, gravure or intaglio printing.

U.S. Pat. No. 5,863,319 (Baker et al.), the disclosure of which is totally incorporated herein by reference, discloses a thermally stable ink for use in ink jet printing contains an ester amide resin, a tackifying resin, and a colorant, U.S. Pat. No. 6,174,937 (Banning et al.), the disclosure of which is totally incorporated herein by reference, discloses a phase change ink comprising a material of the formula

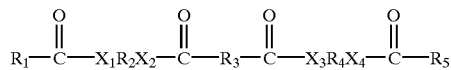

wherein $X_1$, $X_2$, $X_3$, and $X_4$ are segments comprising atoms selected from groups V and VI of the periodic table; wherein at least one $R_1$ and $R_5$ comprises at least 37 carbon units; and wherein $R_2$, $R_3$, and $R_4$ each comprise at least one carbon unit. The invention further encompasses a composition of matter, as well as methods of reducing coefficients of friction of phase change ink formulations.

U.S. Pat. No. 4,889,560 (Jaeger et al.), the disclosure of which is totally incorporated herein by reference, discloses a phase change ink carrier composition combined with a compatible colorant to form a phase change ink composition. A thin film of substantially uniform thickness of that phase change ink carrier composition, and the ink produced therefrom, has a high degree of lightness and chroma. The thin films of a substantially uniform thickness of the ink composition are also rectilinearly light transmissive. The carrier composition is preferably a fatty amide-containing compound.

U.S. Pat. No. 4,889,761 (Titterington et al.), the disclosure of which is totally incorporated herein by reference, discloses a method for producing a light-transmissive phase change ink printed substrate which comprises providing a substrate, and then printing on at least one surface of the substrate a predetermined pattern of a light-transmissive phase change ink which initially transmits light in a non-rectilinear path. The pattern of solidified phase change ink is then reoriented to form an ink layer of substantially uniform thickness. This ink layer will, in turn, produce an image which then will transmit light in a substantially rectilinear path. In one aspect of the invention, the substrate is light transmissive, and the reoriented printed substrate exhibits a high degree of lightness and chroma, and transmits light in a substantially rectilinear path. In this way, the reoriented printed substrate can be used in a projection device to project an image containing clear, saturated colors.

U.S. Pat. No. 5,597,856 (Yu et al.), the disclosure of which is totally incorporated herein by reference, discloses phase change inks capable of passing light therethrough which are suitable for color overhead transparencies, as well as plain paper printing. A composition for the ink carrier comprises an unsaturated bis-amide as a transparency enhancer, a low viscosity monoamide as a thinner material, and a polyamide resin as a base and binder.

British Patent GB 2 238 792, the disclosure of which is totally incorporated herein by reference, discloses a coating composition comprising a film-forming resinous component together with a liquid carrier thereafter, in which composition the film-forming resinous component contains a film-forming polyamide containing fluorine atoms.

U.S. Pat. No. 5,372,852 (Titterington et al.), the disclosure of which is totally incorporated herein by reference, discloses a phase change ink composition that is indirectly applied to a substrate by raising the temperature of the phase change ink composition to form a liquid phase change ink composition, applying droplets of the phase change ink composition in a liquid phase to a liquid intermediate transfer surface on a solid support in a pattern using a device such as an ink jet printhead, solidifying the phase change ink composition on the liquid intermediate transfer surface, transferring the phase change ink composition from the liquid intermediate transfer surface to the substrate, and fixing the phase change ink composition to the substrate. The phase change ink composition is malleable when the ink is transferred from the intermediate transfer surface to the substrate and is ductile after the ink has been transferred to the substrate and cooled to ambient temperature to preclude the ink from crumbling and cracking.

U.S. Pat. No. 4,895,982 (Pavlin et al.), the disclosure of which is totally incorporated herein by reference, discloses tricarboxylic acids that are prepared by reacting unsaturated mono- and dicarboxylic acids of specific carbon atom content in the presence of a catalytic proportion of an unactivated clay and water. The product acids of 34, 35, 36, 38, or 40 carbon atoms are useful as corrosion inhibitors, epoxy resins curing agents, lubricants, polymeric resin plasticizers and intermediates for synthetic polymeric resins.

U.S. Pat. No. 4,066,585 (Schepp et al.), the disclosure of which is totally incorporated herein by reference, discloses intaglio and flexographic printing processes employing solvent-free inks, solid at room temperature but molten at printing temperatures, and inks suitable therefor, said inks comprising a pigment and a thermoplastic binder having a softening point between 90° C. and 160° C., said binder comprising a synthetic polyamide resin or synthetic polyesteramide resin, each resin being the condensation product of (1) an acid component comprising a dimerized fatty acid and a monocarboxylic acid and (2) an amine component comprising a diamine and, in the case of the polyesteramide resin, additionally comprising a diol and/or alkanolamine.

U.S. Pat. No. 3,622,604 (Drawert et al.), the disclosure of which is totally incorporated herein by reference, discloses synthetic polyamides, useful as binders in the formulation of printing inks, formed between a dimeric fatty acid, an unsubstituted lower aliphatic monocarboxylic acid, ethylene diamine, and certain aromatic, cycloaliphatic, and other aliphatic diamines, including aliphatic ether diamines, and methods for preparing such amides.

U.S. Pat. No. 3,253,940 (Floyd et al.), the disclosure of which is totally incorporated herein by reference, discloses polyamide resins and solutions thereof suitable for use as flexographic ink vehicles, and particularly alcohol solutions of polyamides obtained by reacting a mixture comprising polymeric fat acids, alkylene polyamines, and a low aliphatic monobasic acid.

U.S. Pat. No. 5,510,821 (Jones et al.), the disclosure of which is totally incorporated herein by reference, discloses an ink stick shape for use in a printer ink stick feed chute wherein the opposing sides of the ink stick are tapered or angled from the horizontal so that at least one area intermediate the top and the bottom of the ink stick is a greater distance from the horizontal than the junction of the side walls and the bottom of the ink stick. The ink stick shape or geometry may be keyed to a particular color.

U.S. Pat. No. 5,988,805 (Meinhardt), the disclosure of which is totally incorporated herein by reference, discloses an ink stick shape for use in a printer ink stick feed chute wherein the opposing sides of the ink stick are tapered or angled from the horizontal so that at least one area intermediate the top and the bottom of the ink stick is a greater distance from the horizontal than the junction of the side walls and the bottom of the ink stick. The ink stick shape or geometry may be keyed to a particular color.

U.S. Pat. No. 6,133,353 (Bui et al.), the disclosure of which is totally incorporated herein by reference, discloses a solubilizing agent and a compound made by reacting selected nucleophiles, including fatty acid reactants and amines with an isocyanate. The addition of the isocyanate and the different nucleophiles will create a di-urethane tetra-amide solubilizing agent product. The polyamide-solubilizing agent is useful as an ingredient in a phase change solid imaging material and as carrier compositions used to make phase change ink jet inks.

U.S. Pat. No. 6,528,613 (Bui et al.), the disclosure of which is totally incorporated herein by reference, discloses a solubilizing agent and a compound made by reacting selected nucleophiles, including fatty acid reactants and amines with an isocyanate. The addition of the isocyanate and the different nucleophiles will create a di-urethane tetra-amide solubilizing agent product. The polyamide-solubilizing agent is useful as an ingredient in a phase change solid imaging material and as carrier compositions used to make phase change ink jet inks.

U.S. Pat. No. 5,777,023 (Pavlin), the disclosure of which is totally incorporated herein by reference, discloses solid compositions containing diamidediurethanes that are useful as components of hot-melt inks. Diamidediurethanes may be prepared by reaction of a hydroxycarboxylic acid and/or lactone with either (1) monoamine and diisocyanate or (2) diamine and monoisocyanate. Alternatively, the diamidediurethane may be prepared by reacting a non-hydric carboxylic acid and/or anhydride with a hydroxyamine and a diisocyanate. The reactant identity and stoichiometry, as well as the reaction conditions, may be tailored to optimize the formation of diamidediurethane in preference to high molecular weight oligomers. The hot-melt inks may be used in ink jet, flexographic, gravure and intaglio printing.

While known compositions and processes are suitable for their intended purposes, a need remains for improved phase change inks. In addition, a need remains for phase change inks having ink carriers having improved miscibility with polyethylene waxes. Further, a need remains for phase change inks containing branched, rather than linear, amide carriers. Additionally a need remains for phase change inks containing amide carriers with reduced viscosity. There is also a need for phase change inks containing amide carriers having desirably low melting points compared to other amides of similar molecular weight and similar ratio of amide groups to hydrocarbon portion.

SUMMARY OF THE INVENTION

The present invention is directed to a phase change ink composition comprising (a) a colorant and (b) a carrier comprising a polyamide, wherein the polyamide component of the carrier contains at least about 10 percent by weight of a branched triamide. Another embodiment of the present invention is directed to a phase change ink composition comprising (a) a colorant and (b) a phase change ink carrier comprising a polyamide, wherein the polyamide component of the carrier contains at least about 10 percent by weight of a branched triamide which is the reaction product of either (i) a mixture consisting essentially of at least one monoacid, at least one branched triamine, and optional ingredients nonreactive with the monoacid, the triamine, and the reaction product thereof, or (ii) a mixture consisting essentially of at least one monoamine, at least one branched triacid, and optional ingredients nonreactive with the triacid, the monoamine, and the reaction product thereof. Yet another embodiment of the present invention is directed to a phase change ink composition comprising (a) a colorant and (b) a phase change ink carrier comprising a polyamide, wherein the polyamide component of the carrier contains at least about 10 percent by weight of a branched triamide which is the reaction product of either (i) a mixture comprising at least one branched triamine and at least one monoacid present in an amount of at least about 3 moles of monoacid per every one mole of branched triamine, or (b) a mixture comprising at least one branched triacid and at least one monoamine present in an amount of at least about 2.5 moles of monoamine per every one mole of branched triacid.

DETAILED DESCRIPTION OF THE INVENTION

The ink compositions of the present invention contain an ink carrier which comprises a polyamide, wherein the polyamide component of the carrier contains at least about 10 percent by weight of a branched triamide. By "branched triamide" is meant that the structure of the triamide can be drawn so that each amide group is bonded to an atom or group of atoms contained in a branch other than that of the others, and that each amide group is in a different branch. By "each amide group is in a different branch" is meant that the triamide is not linear; by "linear" is meant a molecule wherein all three amide groups can be drawn as being in the same molecular chain or branch, such as linear triamides of the formulae

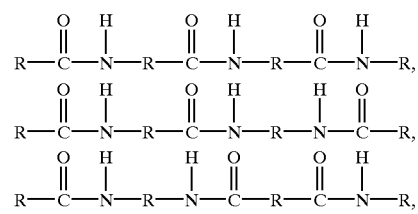

-continued

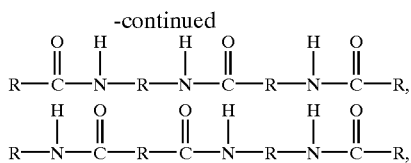

or the like. For purposes of the present invention, linear triamides include those wherein a line can be drawn through the three amide groups, even if one would ordinarily draw a different line. For example, a compound of the formula

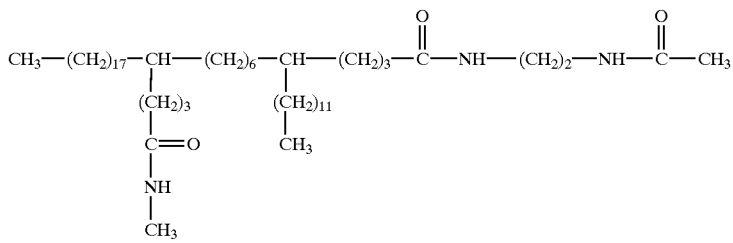

is considered a linear compound for purposes of the present invention, because it can also be drawn as follows:

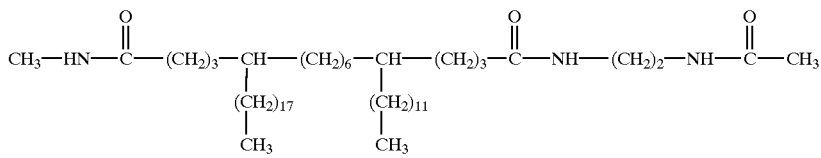

and accordingly would not be considered to be a branched triamide within the scope of the present invention. For purposes of the present invention, "branched triamines", "branched triacids", "branched monoamino diacids", and "branched diamino monoacids" have similar definitions in that each of the three functional groups named can be drawn as being in a different branch from the other two.

Examples of suitable branched triamides include (but are not limited to) those generated from branched triamines, said branched triamides being of the formula

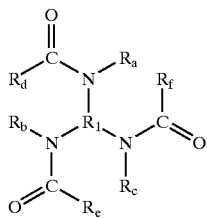

wherein $R_1$ is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least about 3 carbon atoms, in another embodiment with at least about 4 carbon atoms, in yet another embodiment with at least about 5 carbon atoms, in another embodiment with at least about 15 carbon atoms, and in yet another embodiment with at least about 21 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolylene or the like, $R_a$, $R_b$, and $R_c$ each, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 7 carbon atoms, and in yet another embodiment with at least about 10 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, $R_d$, $R_e$, and $R_f$ each, independently of the others, is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 2 carbon atoms, in yet another embodiment with at least about 6 carbon atoms, in another embodiment with at least about 17 carbon atoms, and in yet another embodiment with at least about 36 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, those generated from branched triacids, said branched triamides being of the formula

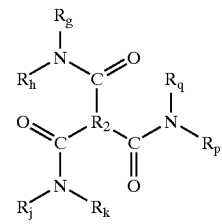

wherein $R_2$ is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least about 3 carbon atoms, in another embodiment with at least about 4 carbon atoms, in yet another embodiment with at least about 5 carbon atoms, in another embodiment with at least about 15 carbon atoms, and in yet another embodiment with at least about 21 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzylene or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolylene or the like, $R_g$, $R_j$, and $R_p$ each, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atoms, in another embodiment with at least about 2 carbon atoms, in yet another embodiment with at least about 3 carbon atoms, in another embodiment with at least about 6 carbon atoms, and in yet another embodiment with at least about 18 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 10 carbon atoms, and in yet another embodiment with at least about 14 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, $R_h$, $R_k$, and $R_q$ each, independently of the others, is (i) a hydrogen atom, (ii) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least about 1 carbon atom, in another embodiment with at least about 2 carbon atoms, in yet another embodiment with at least about 3 carbon atoms, in another embodiment with at least about 4 carbon atoms, and in yet another embodiment with at least about 5 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, in another embodiment with at least about 7 carbon atoms, and in yet another embodiment with at least about 8 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, (iv) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as benzyl or the like, or (v) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, in another embodiment with at least about 8 carbon atoms, and in yet another embodiment with at least about 9 carbon atoms, and in one embodiment with no more than about 200 carbon atoms, in another embodiment with no more than about 150 carbon atoms, and in yet another embodiment with no more than about 100 carbon atoms, although the number of carbon atoms can be outside of these ranges, such as tolyl or the like, those generated from branched diamino monoacid compounds, said branched triamides being of the formula

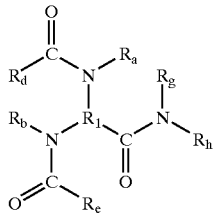

wherein $R_1$, $R_a$, $R_b$, $R_d$, $R_e$, $R_g$, and $R_h$ are as defined hereinabove, those generated from branched monoamino diacid compounds, said branched triamides being of the formula

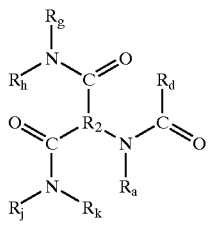

wherein $R_2$, $R_a$, $R_d$, $R_g$, $R_h$, $R_j$, and $R_k$ are as defined hereinabove, and the like, wherein the substituents on the substituted alkyl, alkylene, aryl, arylene, arylalkyl, arylalkylene, alkylaryl, and alkylarylene groups can be (but are not limited to) hydroxy groups, halogen atoms, imine groups, ammonium groups, cyano groups, pyridine groups, pyridinium groups, ether groups, aldehyde groups, ketone groups, ester groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, azide groups, azo groups, cyanato groups, carboxylate groups, mixtures thereof, and the like, wherein two or more substituents can be joined together to form a ring.

In one specific embodiment, when the triamide is of the formula

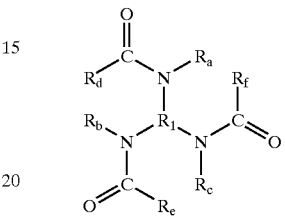

the total number of carbon atoms in $R_1+R_a+R_b+R_c+R_d+R_e+R_f$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges.

In one specific embodiment, when the triamide is of the formula

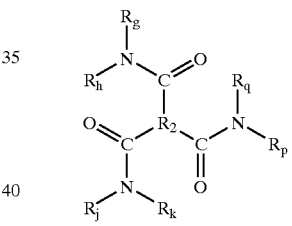

the total number of carbon atoms in $R_2+R_g+R_h+R_j+R_k+R_p+R_q$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges.

In one specific embodiment, when the triamide is of the formula

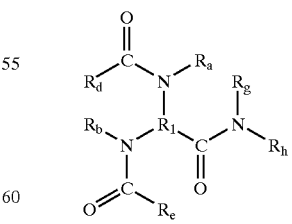

the total number of carbon atoms in $R_1+R_a+R_b+R_d+R_e+R_g+R_h$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges.

In one specific embodiment, when the triamide is of the formula

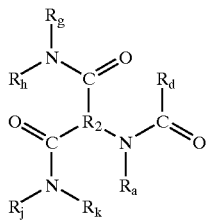

the total number of carbon atoms in $R_2+R_a+R_d+R_g+R_h+R_j+R_k$ is at least about 7, in another embodiment at least about 10, and in yet another embodiment at least about 12, and in one embodiment no more than about 500, in another embodiment no more than about 350, and in yet another embodiment no more than about 300, although the total number of carbon atoms can be outside of these ranges.

It must be emphasized that not all of the amide groups in the first formula need to be directly bonded to the same atom in the $R_1$ or $R_2$ group, and in one specific embodiment of the present invention, each amide group is bonded to a different atom in the $R_1$ or $R_2$ group.

Compounds of the formula

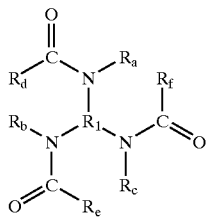

can be prepared by reacting a branched triamine with at least one monoacid. When only one monoacid is used, the reaction proceeds as follows:

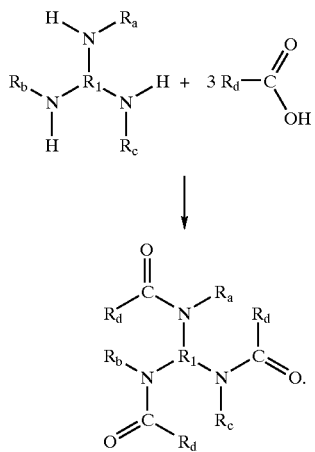

When a mixture of monoacids is used, such as a mixture containing $R_d$—COOH, $R_e$—COOH, and $R_f$—COOH, products of the formula

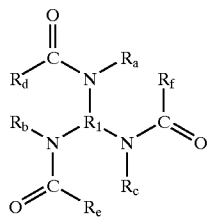

can be obtained. The triamine and monoacid are present in any desired or effective relative amounts, in one embodiment at least about 3 moles of monoacid per every one mole of triamine, in another embodiment at least about 3.1 moles of monoacid per every one mole of triamine, and in yet another embodiment at least about 4 moles of monoacid per every one mole of triamine, and in one embodiment no more than about 30 moles of monoacid per every one mole of triamine, in another embodiment no more than about 25 moles of monoacid per every one mole of triamine, in yet another embodiment no more than about 20 moles of monoacid per every one mole of triamine, and in another embodiment no more than about 5 moles of monoacid per every one mole of triamine, although the relative amounts can be outside of these ranges.

Compounds of the formula

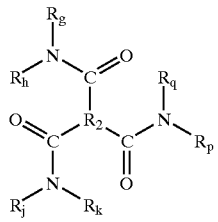

can be prepared by reacting a branched triacid with at least one monoamine. When only one monoamine is used, the reaction proceeds as follows:

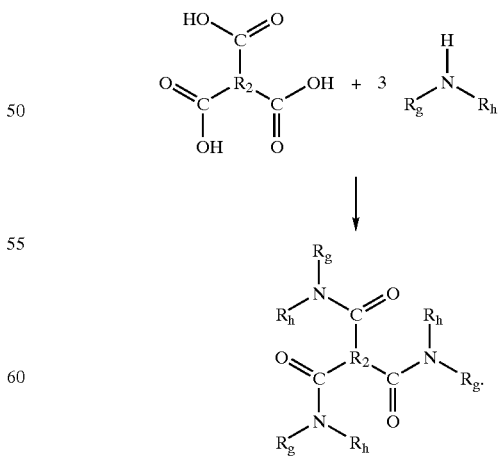

When a mixture of monoamines is used, such as a mixture containing

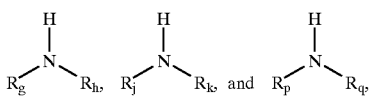

products of the formula

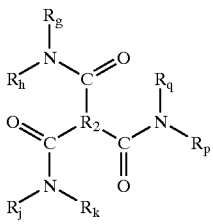

can be obtained. The triacid and monoamine are present in any desired or effective relative amounts, in one embodiment at least about 2.5 moles of monoamine per every one mole of triacid, in another embodiment at least about 2.9 moles of monoamine per every one mole of triacid, and in yet another embodiment at least about 3 moles of monoamine per every one mole of triacid, and in one embodiment no more than about 15 moles of monoamine per every one mole of triacid, in another embodiment no more than about 12 moles of monoamine per every one mole of triacid, in yet another embodiment no more than about 10 moles of monoamine per every one mole of triacid, and in yet another embodiment no more than about 4 moles of monoamine per every one mole of triacid, although the relative amounts can be outside of these ranges.

The compounds of the formulae

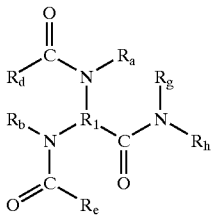

and

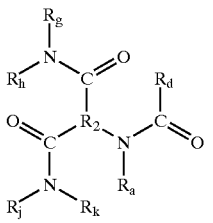

can be prepared by similar methods, in one embodiment in a process in which the amine group or groups are first protected by any desired or effective method, such as reaction with phosgene derivatives of the formula

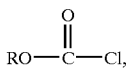

followed by reacting the acid group or groups with the monoamine, followed by deprotection of the protected amine groups, followed by reacting the amine group or groups with the monoacid.

The reaction between the acid and the amine can take place neat in the absence of a solvent, or, optionally in the presence of a solvent. Particularly desirable solvents are those that can form an azeotrope with water and carry out the water byproduct of the amidation reaction, such as toluene, xylene, or the like. When present, the solvent is present in any desired or effective amount, in one embodiment up to about 5 parts by weight per every one part by weight of the total reactants, although the amount can be outside of this range. When no solvent is used, it can be useful to remove the water byproduct from the reaction mixture by other means, such as by blowing a gas through the reaction mixture, pulling a vacuum on the reaction mixture, or the like to drive the reaction to completion.

While not required, the amine and the acid can be reacted in an inert atmosphere, particularly when it is desired to reduce or eliminate color in the triamide product.

The amine and the acid are admixed with each other. In one specific embodiment, the acid is heated, followed by addition of the amine to the heated acid, which enables production of less colored products, although the reaction can also be performed by adding the acid to the amine.

The amine and the acid are allowed to react at any desired or effective temperature, in one embodiment at least about 120° C., in another embodiment at least about 150° C., and in yet another embodiment at least about 180° C., and in one embodiment no more than about 300° C., in another embodiment no more than about 260° C., and in yet another embodiment no more than about 240° C., although the reaction temperature can be outside of these ranges.

The amine and the acid are allowed to react for any desired or effective period of time, in one embodiment at least about 1 hour, in another embodiment at least about 3 hours, and in yet another embodiment at least about 4 hours, and in one embodiment no more than about 12 hours, in another embodiment no more than about 10 hours, and in yet another embodiment no more than about 8 hours, although the reaction time can be outside of these ranges.

Optionally, the reaction mixture can also contain ingredients that do not react with the acid, the amine, or the reaction product thereof, such as antioxidants commonly used in phase change inks (which, when present in the reaction mixture, can in some cases reduce coloration of the reaction product), waxes, such as polyethylene waxes commonly used in phase change inks, or the like.

The triamide can, if desired, function as the sole ink carrier. Optionally, the triamide can be admixed with other materials to create an ink carrier. Any desired or effective carrier composition can be used. Examples of suitable ink carrier materials include fatty amides, such as monoamides, tetra-amides, mixtures thereof, and the like. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference. When the ink carder contains other polyamides, such as tetra-amides or the like, the polyamide component of the carrier contains at least about 10 percent by weight of the branched triamide. In one specific embodiment, the polyamide component of the ink carrier contains at least about 20 percent by weight of the branched triamide, in another embodiment at least about 50 percent by weight of the branched triamide, in yet another embodiment at least about 60 percent by weight of the branched triamide, in still another embodiment at least about 70 percent by weight of the branched triamide, in yet still another embodiment at least about 80 percent by weight of the branched triamide, in another embodiment at least about 90 percent by weight of the branched triamide, and in yet another embodiment about 100 percent by weight of the branched triamide.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Mixtures of fatty amide materials and isocyanate-derived materials can also be employed in the ink carrier composition for inks of the present invention.

Additional suitable phase change ink carrier materials for the present invention include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

When the triamide or a mixture of triamide with other polyamides is present in combination with other materials to make up the ink carrier, the polyamide component is present in any desired or effective amount, in one embodiment at least about 5 percent by weight of the carrier, in another embodiment at least about 15 percent by weight of the carrier, and in yet another embodiment at least about 25 percent by weight of the carrier, and in one embodiment no more than about 90 percent by weight of the carrier, in another embodiment no more than about 80 percent by weight of the carrier, and in yet another embodiment no more than about 70 percent by weight of the carrier, although the amount of triamide or polyamide mixture can be outside of these ranges.

The ink carrier is present in the phase change ink of the present invention in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink. In another embodiment of no more than about 98 percent by weight of the ink, and in yet another embodiment of no more than about 95 percent by weight of the ink, although the amount can be outside of these ranges.

While not being limited to any particular theory, it is believed that in contrast to polyamides such as tetra-amides, which tend to be linear and of general formulae such as

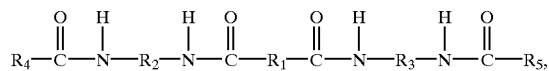

the triamides of the present invention are branched or star-shaped. Again, while not being limited to any particular theory, it is believed that the branched or star shape of these materials enables the triamides to have reduced viscosity compared to, for example, tetra-amides of comparable molecular weight and comparable ratio of amide groups to hydrocarbon in the molecule, in addition, while not being limited to any particular theory, it is believed that the branched or star shape of these materials enables the triamides to exhibit miscibility with polyethylene waxes over a wider mixing range; for example, when a tetra-amide might exhibit a miscibility with polyethylene waxes over a range of only about 20 percent by weight or more amide in the wax, a triamide might exhibit a miscibility with polyethylene waxes over a range of from about 10 to about 70 percent by weight amide in the wax. These characteristics of the triamides provide another level of freedom in optimizing phase change ink formulations having desirable viscosity values and desirable performance in automatic document handlers and feeders.

The phase change ink compositions of the present invention also contain a colorant. Any desired or effective colorant can be employed in the inks of the present invention, including dyes, pigments, mixtures thereof, and the like, provided that the colorant can be dissolved or dispersed in the ink vehicle. The phase change carrier compositions of the current invention can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thlokol); Diaazol Black RN Quad (ICI); Orasol Blue GN (Ciba-Geigy); Savinyl Blue GLS (Sandoz); Luxol Blue MBSN (Morton-Thlokol); Sevron Blue 5GMF (ICI); Basacid Blue 750 (BASF), Neozapon Black X51 (C.I. Solvent Black, C.I. 12195) (BASF), Sudan Blue 670 (C.I. 61554) (BASF), Sudan Yellow 146 (C.I. 12700) (BASF), Sudan Red 462 (C.I. 26050) (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks of the present invention. Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy), Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like.

Also suitable are the colorants disclosed in U.S. Pat. No. 6,472,523, Copending application U.S. Ser. No. 10/072,210, filed Feb. 8, 2002, entitled "Ink Compositions Containing Phthalocyanines," U.S. Pat. No. 6,476,219, U.S. Pat. No. 6,576,747, Copending application U.S. Ser. No. 10/185,994, filed Jun. 27, 2002, entitled "Dimeric Azo Pyridone Colorants," Copending application U.S. Ser. No. 10/184,269, filed Jun. 27, 2002, entitled "Phase Change Inks Containing Dimeric Azo Pyridone Colorants," Copending application U.S. Ser. No. 10/185,264, filed Jun. 27, 2002, entitled "Phase Change Inks Containing Azo Pyridone Colorants," Copending application U.S. Ser. No. 10/186,024, filed Jun. 27, 2002, entitled "Azo Pyridone Colorants," Copending application U.S. Ser. No. 10/185,597, filed Jun. 27, 2002, entitled "Process for Preparing Substituted Pyridone Compounds," U.S. Pat. No. 6,576,748, Copending application U.S. Ser. No. 10/186,023, filed Jun. 27, 2002, entitled "Dimeric Azo Pyridone Colorants," Copending application U.S. Ser. No. 10/184,266, filed Jun. 27, 2002, entitled "Phase Change Inks Containing Dimeric Azo Pyridone Colorants," Copending application U.S. Ser. No. 10/260,146, filed Sep. 27, 2002, entitled "Colorant Compounds," Copending application U.S. Ser. No. 10/260,376, filed Sep. 27, 2002, entitled "Phase Change Inks," and Copending application U.S. Ser. No. 10/260,379, filed Sep. 27, 2002, entitled "Methods for Making Colorant Compounds," the disclosures of each of which are totally incorporated herein by reference.

Other ink colors besides the subtractive primary colors can be desirable for applications such as postal marking or industrial marking and labelling using phase change printing, and the present invention is applicable to these needs. Further, infrared (IR) or ultraviolet (UV) absorbing dyes can also be incorporated into the inks of the present invention for use in applications such as "invisible" coding or marking of products. Examples of such infrared and ultraviolet absorbing dyes are disclosed in, for example, U.S. Pat. No. 5,378,574, U.S. Pat. No. 5,146,087, U.S. Pat. No. 5,145,518, U.S. Pat. No. 5,543,177, U.S. Pat. No. 5,225,900, U.S. Pat. No. 5,301,044, U.S. Pat. No. 5,286,286, U.S. Pat. No. 5,275,647, U.S. Pat. No. 5,208,630, U.S. Pat. No. 5,202,265, U.S. Pat. No. 5,271,764, U.S. Pat. No. 5,256,193, U.S. Pat. No. 5,385,803, and U.S. Pat. No. 5,554,480, the disclosures of each of which are totally incorporated herein by reference.

In a specific embodiment, the colorant is an isocyanate-derived colored resin as disclosed in, for example, U.S. Pat. No. 5,780,528 and U.S. Pat. No. 5,919,839, the disclosures of each of which are totally incorporated herein by reference. In this embodiment, the colorant is the reaction product of a hydroxyl-substituted or primary or secondary amino-substituted chromophore with an isocyanate. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Specific examples of suitable isocyanates include those listed hereinabove as being suitable for reaction with the hydroxyl-substituted or amino-substituted antioxidant. Examples of suitable hydroxyl-substituted and primary or secondary amino-substituted chromophores include those disclosed in, for example, U.S. Pat. No. 3,157,633, U.S. Pat. No. 3,927,044, U.S. Pat. No. 3,994,835, U.S. Pat. No. 4,102,644, U.S. Pat. No. 4,113,721, U.S. Pat. No. 4,132,840, U.S. Pat. No. 4,137,243, U.S. Pat. No. 4,170,564, U.S. Pat. No. 4,284,729, U.S. Pat. No. 4,507,407, U.S. Pat. No. 4,640,690, U.S. Pat. No. 4,732,570, U.S. Pat. No. 4,751,254, U.S. Pat. No. 4,751,254, U.S. Pat. No. 4,761,502, U.S. Pat. No. 4,775,748, U.S. Pat. No. 4,812,141, U.S. Pat. No. 4,846,846, U.S. Pat. No. 4,871,371, U.S. Pat. No. 4,912,203, U.S. Pat. No. 4,978,362, U.S. Pat. No. 5,043,013, U.S. Pat. No. 5,059,244, U.S. Pat. No. 5,149,800, U.S. Pat. No. 5,177,200, U.S. Pat. No. 5,270,363, U.S. Pat. No. 5,290,921, and U.S. Pat. No. 5,731,398, the disclosures of each of which are totally incorporated herein by reference. Hydroxyl-containing and primary or secondary amino-containing colorants from the classes of Color Index (C.I.) Solvent Dyes, Disperse Dyes, modified Acid and Direct Dyes, Basic Dyes, Sulphur Dyes, Vat Dyes, and the like can also be used.

The colorant is present in the phase change ink of the present invention in any desired or effective amount to obtain the desired color or hue, typically at least about 0.1 percent by weight of the ink, preferably at least about 0.2 percent by weight of the ink, and more preferably at least about 0.5 percent by weight of the ink, and typically no more than about 50 percent by weight of the ink, preferably no more than about 20 percent by weight of the ink, and more preferably no more than about 10 percent by weight of the ink, although the amount can be outside of these ranges.

The inks of the present invention can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512 (commercially available from Uniroyal Chemical Company, Oxford, Conn.), IRGANOX® 1010 (commercially available from Ciba Geigy), and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

The inks of the present invention can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The inks of the present invention can also optionally contain other materials. The phase change carrier composition is typically designed for use in either a direct printing mode or an indirect or offset printing transfer system.

In the direct printing mode, the phase change carrier composition in specific embodiments contains one or more materials that enable the phase change ink (1) to be applied in a thin film of uniform thickness on the final recording substrate (such as paper, transparency material, or the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in specific embodiments exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

The ink compositions of the present invention typically have melting points no lower than about 50° C., preferably no lower than about 70° C., and more preferably no lower than about 80° C., and typically have melting points no higher than about 160° C., preferably no higher than about 140° C., and more preferably no higher than about 100° C., although the melting point can be outside of these ranges.

The ink compositions of the present invention generally have melt viscosities at the jetting temperature (typically no lower than about 75° C., preferably no lower than about 100° C., and more preferably no lower than about 120° C., and typically no higher than about 180° C., preferably no higher than about 150° C., and more preferably no higher than about 130° C., although the jetting temperature can be outside of these ranges) typically of no more than about 30 centipoise, preferably no more than about 20 centipoise, and even more preferably no more than about 15 centipoise, and typically of no less than about 2 centipoise, preferably no less than about 5 centipoise, and even more preferably no less than about 7 centipoise, although the melt viscosity can be outside of these ranges. Since image hardness tend to drop with lower viscosities, it is preferred that the viscosity be as low as possible while still retaining the desired degree of image hardness.

The ink compositions of the present invention can be prepared by any desired or suitable method. For example, the ink ingredients can be mixed together, followed by heating, typically to a temperature of from about 100 to about 140° C., although the temperature can be outside of this range, and stirring until a homogeneous ink composition is obtained, followed by cooling the ink to ambient temperature (typically from about 20 to about 25° C.). The inks of the present invention are solid at ambient temperature.

The inks of the present invention can be employed in apparatus for direct printing ink jet processes and in indirect (offset) printing ink jet applications. Another embodiment of the present invention is directed to a process which comprises incorporating an ink of the present invention into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment of the present invention is directed to a process which comprises incorporating an ink of the present invention into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. An offset or indirect printing process is also disclosed in, for example, U.S. Pat. No. 5,389,958, the disclosure of which is totally incorporated herein by reference. In one specific embodiment of the offset or indirect printing process, the intermediate transfer member is heated to a temperature above that of the final recording sheet and below that of the melted ink in the printing apparatus. In one specific embodiment, the printing apparatus employs a piezoelectric printing process wherein droplets of the ink are caused to be ejected in imagewise pattern by oscillations of piezoelectric vibrating elements. Inks of the present invention can also be employed in other hot melt printing processes, such as hot melt acoustic ink jet printing, hot melt thermal ink jet printing, hot melt continuous stream or deflection ink jet printing, or the like. Phase change inks of the present invention can also be used in printing processes other than hot melt ink jet printing processes, such as hot melt gravure printing, hot melt medical imaging printing, or the like.

Any suitable substrate or recording sheet can be employed, including plain papers such as XEROX® 4024 papers, XEROX® image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

To a 1,000 milliliter four-neck round bottom flask fitted with a Trubore stirrer, $N_2$ inlet, Dean-Stark trap with condenser and $N_2$ outlet and thermocouple-temperature controller was added 350.62 grams (0.3675 moles) of UNICID 700 (a mono-acid obtained from Baker-Petrolite Corp., Cincinnati, Ohio, of the formula $CH_3(CH_2)_nCOOH$, wherein n has an average value of about 46 and is believed to have a range of from about 40 to about 52) and 0.79 grams of NAUGARD 524 (antioxidant obtained from Uniroyal Chemical Company, Inc., Middlebury, Conn.). The mixture was heated to 115° C. to melt and stirred at atmospheric pressure under $N_2$. 51.33 grams (0.1167 moles) of JEFFAMINE T-403 (mixture of triamines obtained from Huntsman Corporation, Houston, Tex., of the formula

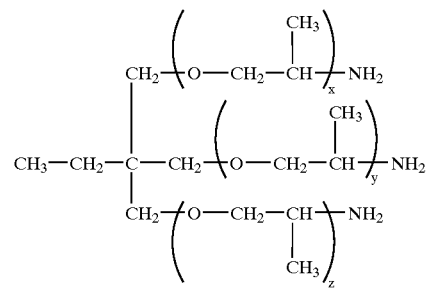

wherein x, y, and z are each integers representing the number of repeat propyleneoxy units, wherein x, y, and z may each be zero, and wherein the sum of x+y+z is from about 5 to about 6) was then added to the reaction mixture, and the reaction temperature was increased to 200° C. gradually over 0.5 hour and held at that temperature for another 3 hours. Some water was carried out by slow blowing $N_2$ and condensed into the trap when the mixture temperature reached about 180° C. The trap and condenser were then removed, and vacuum (about 25 mm Hg) was applied for about 0.5 hour and then released. The liquid product was cooled down to about 150° C. and poured onto aluminum to solidify. The resulting product was believed to be of the formula

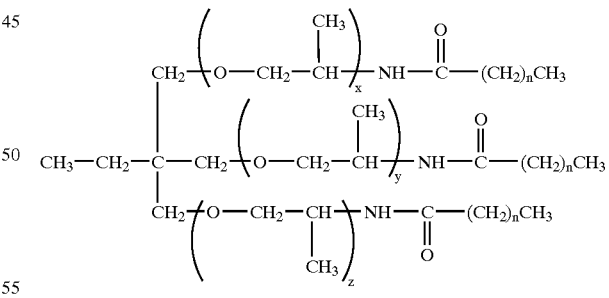

wherein n, x, y, and z are as defined hereinabove in this Example. This material is an example of one having heteroatoms (i.e., oxygen) in a central R alkylene group. The resulting triamide product was titrated for its acid number and amine value measured in units of mg KOH per gram. Acid and amine values were determined by dissolving the material in a mixture of 50 percent by weight butanol and 50 percent by weight toluene, heating, and titrating the acid number with aqueous potassium hydroxide and titrating the amine number with aqueous hydrogen chloride. The acid and amine numbers indicated the degree of reaction completion, indicating how much amine remained in the molecule; residual amine can in some instances discolor if incorporated into a phase change ink. Its viscosity was measured (in centipoise) on a Ferrani-Shirley cone-plate viscometer at 135° C. Its melting point was measured (in ° C.) by differential scanning calorimetry using a TA instrument 2920 calorimeter at a scanning rate of 20° C. per minute; the DSC scan had two melting peaks, and both numbers are reported. The results were as indicated below in Table 1. Miscibility of this triamide product with POLY-WAX PE 655 (polyethylene wax obtained from Baker-Petrolite Co., Tulsa, Okla.) was tested by melting, shaking the mixture at 135° C., and then checking its clarity visually. The mixtures were melted, shaken, and then checked visually; clear mixtures were considered miscible, and hazy mixtures were considered not miscible. The hazy mixtures eventually become two phase mixtures after standing still in the oven at 135° C. The results were as indicated below in Table 2.

EXAMPLE II

The procedure of Example I was repeated with the same stoichiometry but UNICID 550 (a mono-acid obtained from Baker-Petrolite Corp., Cincinnati, Ohio, of the formula $CH_3(CH_2)_nCOOH$, wherein n has an average value of about 37 and is believed to have a range of from about 34 to about 40). The product was believed to be of the formula

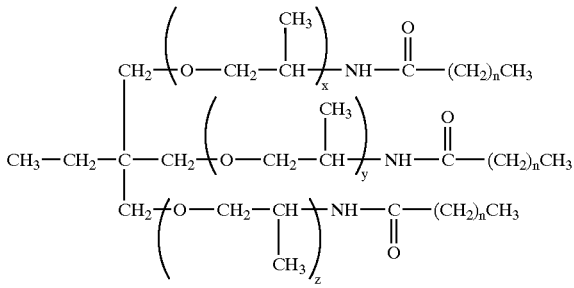

n is as defined hereinabove in this Example and x, y, and z are as defined in Example I. The properties of the resulting triamide product are listed in Tables 1 and 2.

EXAMPLE III

The procedure of Example I was repeated with the same stoichiometry but UNICID 350 (a mono-acid obtained from Baker-Petrolite Corp., Cincinnati, Ohio, of the formula $CH_3(CH_2)_nCOOH$, wherein n has an average value of about 23 and is believed to have a range of from about 20 to about 26) was used instead of UNICID 700. The product was believed to be of the formula

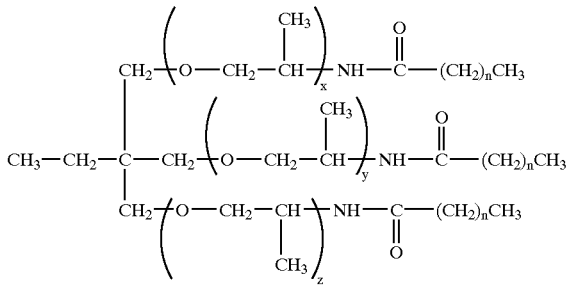

n is as defined hereinabove in this Example and x, y, and z are as defined in Example I. The properties of the resulting triamide product are listed in Tables 1 and 2.

EXAMPLE IV

The procedure of Example I was repeated with the same stoichiometry but stearic acid (a mono-acid obtained from Aldrich Chemical Company, Inc., Milwaukee, Wis.), of the formula

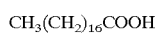

$CH_3(CH_2)_{16}COOH$ was used instead of UNICID 700. The product was believed to be of the formula

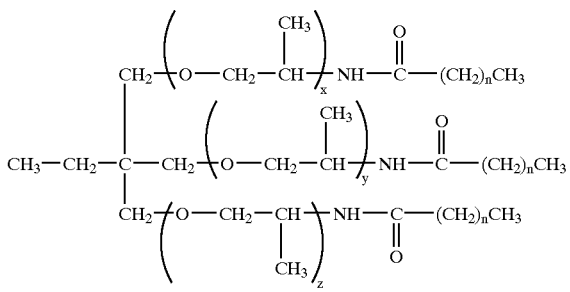

n is 16 and x, y, and z are as defined in Example I. The properties of the resulting triamide product are listed in Tables 1 and 2.

EXAMPLE V

The procedure of Example I was repeated with the same stoichiometry but tris(2-aminoethyl)amine (TREN-HP, 98+%, obtained from Pressure Chemical Co., Pittsburgh, Pa., of the formula $N(CH_2CH_2NH_2)_3$) was used instead of JEFFAMINE T-403. The product was believed to be of the formula $N(CH_2CH_2-NH-C(=O)-(CH_2)_{46}CH_3)_3$. This material is an example of one having a heteroatom (i.e., nitrogen) in a central R alkylene group. The properties of the resulting triamide product are listed in Tables 1 and 2.

EXAMPLE VI

The procedure of Example I was repeated with the same stoichiometry but tris(2-aminoethyl)amine (TREN-HP, 98+%, obtained from Pressure Chemical Co., Pittsburgh, Pa., of the formula $N(CH_2CH_2NH_2)_3$) was used instead of JEFFAMINE T-403 and UNICID 350 (a mono-acid obtained from Baker-Petrolite Corp., Cincinnati, Ohio, of the formula $CH_3(CH_2)_nCOOH$, wherein n has an average value of about 23 and is believed to have a range of from about 20 to about 26) was used instead of UNICID 700. The product was believed to be of the formula $N(CH_2CH_2—NH—C(=O)—(CH_2)_nCH_3)_3$ wherein n is as defined hereinabove in this Example. The properties of the resulting triamide product are listed in Tables 1 and 2.

EXAMPLE VII

The procedure of Example I was repeated with the same stoichiometry but stearic amine (AMINE D, obtained from Hercules Inc., Wilmington, Del., of the formula $CH_3(CH_2)_{17}—NH_2$) was used instead of JEFFAMINE T-403 and EMPOL 1045 (a trimer acid mixture obtained from Henkel Corporation, Cincinnati, Ohio, believed to contain various branched isomers which may include unsaturations and cyclic groups and believed to have about 54 carbon atoms, including the three carbon atoms in the three —COOH groups; further information on trimer acids of this type is disclosed in, for example, "Dimer Acids," *Kirk-Othmer Encyclopedia of Chemical Technology*, Vol. 8, 4$^{th}$ Ed. (1992), pp. 223 to 237, and in U.S. Pat. No. 2,793,219 and U.S. Pat. No. 2,793,220, the disclosures of each of which are totally incorporated herein by reference) was used instead of UNICID 700. The properties of the resulting triamide product are listed in Tables 1 and 2.

COMPARATIVE EXAMPLE A

The procedure of Example I was repeated except that a mixture of 162.82 grams (0.283 moles) of dimer acid (EMPOL 1008, a dimer acid obtained from Henkel Corporation, Cincinnati, Ohio), 583.83 grams (0.612 moles) of UNICID 700, and 1.5 grams of NAUGARD 524 were heated to melt before adding 33.06 grams (0.55 moles) of ethylene diamine (obtained from Aldrich Chemical Company, Milwaukee, Wis.). The properties of the resultant tetra-amide product are listed in Tables 1 and 2.

COMPARATIVE EXAMPLE B

For comparative purposes, the characteristics of UniRez 2970 (a tetra-amide obtained from Union Camp Corporation, Jacksonville, Fla., a dimer acid mixture obtained from Henkel Corporation, Cincinnati, Ohio, believed to contain various branched isomers which may include unsaturations and cyclic groups and believed to have about 36 carbon atoms, including the two carbon atoms in the two —COOH groups; further information on dimer acids of this type is disclosed in, for example, "Dimer Acids," *Kirk-Othmer Encyclopedia of Chemical Technology*, Vol. 8, 4$^{th}$ Ed. (1992), pp. 223 to 237, and in U.S. Pat. No. 2,793,219 and U.S. Pat. No. 2,793,220, the disclosures of each of which are totally incorporated herein by reference) were also measured.

TABLE 1

| Example | viscosity | Melting point | acid number | amine value |
|---|---|---|---|---|
| I | 27.9 | 98.3, 104.5 | 9.6 | 1.7 |
| II | 22.9 | 92.3, 100.3 | 5.6 | 1 |
| III | 13.4 | 58.5, 67.9 | 18 | 1.5 |
| IV | 14.1 | 51.4, 60.8 | 22.3 | 7 |
| V | 39.0 | 115.0 | 4.6 | 0.1 |
| VI | 18.7 | 102.9 | 9.6 | 0.7 |
| VII | 49.8 | 56.14 | 27 | — |
| A | 66 to 69 | 116 to 119 | 7.7 to 14 | 0.4 |
| B | 81 | 108, 125 | — | — |

TABLE 1-continued

| wt. % in PE | Triamides | | | | | | | Tetra-amides | |
|---|---|---|---|---|---|---|---|---|---|
| | I | II | III | IV | V | VI | VII | A | B |
| 10 | clear | clear | clear | Clear | clear | clear | — | haze | haze |
| 15 | — | — | — | — | — | — | — | haze | — |
| 20 | clear | clear | clear | Clear | clear | clear | haze | clear | haze |
| 25 | — | — | — | — | — | — | — | clear | — |
| 30 | clear | clear | clear | Clear | clear | clear | — | clear | haze |
| 35 | — | — | — | — | — | — | — | clear | — |
| 40 | clear | clear | clear | Clear | clear | clear | haze | clear | — |
| 50 | clear | clear | clear | Clear | clear | clear | — | — | haze |
| 60 | — | — | — | — | — | — | haze | clear | — |
| 70 | clear | clear | clear | Clear | clear | clear | — | — | haze |
| 80 | — | — | — | — | — | — | clear | clear | — |

— = not measured

EXAMPLE VIII

In a stainless steel beaker were combined 64.78 grams of a triamide prepared as described in Example II, 117.60 grams of POLYWAX PE655 (polyethylene wax, obtained from Baker Petrolite Co., Tulsa, Okla.), 31.20 grams of a diurethane resin prepared as described in Example I of U.S. Pat. No. 5,830,942, the disclosure of which is totally incorporated herein by reference, 9.60 grams of a urethane resin (adduct of three equivalents of stearyl isocyanate and a glycerol-based alcohol, prepared as described in Example 4 of U.S. Pat. No. 6,309,453, the disclosure of which is totally incorporated herein by reference), 21.6 grams of stearyl stearamide (KEMAMIDE S-180, obtained from Witco Chemical Company, Memphis, Tenn.), and 0.48 grams of NAUGARD 445 (antioxidant obtained from Uniroyal Chemical Company, Inc., Middlebury, Conn.). The materials were melted together at a temperature of about 135° C. in an oven, then blended by stirring in a temperature controlled mantle for 0.5 hour at 135° C. To the mixture, was then added 8.60 grams of SAVINYL BLACK NS (solvent soluble black dye, obtained from Clariant Corp., Coventry, R.I.). The mixture was stirred for an additional 2 hours, and then 2.30 grams of Hyflo Supercel filter aid (obtained from Fluka Chemical) was added and stirred for another 30 minutes. The ink was then filtered through a heated (135° C.) Mott apparatus (available from Mott Metallurgical) using Whatman #3 filter paper at 15 pounds per square inch. The filtered ink was poured into molds and allowed to solidify to form ink sticks. This final black ink product exhibited a viscosity of about 11.77 centipoise at 135° C. as measured by a Rheometric Scientific RS2000 cone-plate viscometer. The spectral strength of the ink was determined by dissolving the ink in butanol and measuring the absorbance using a Perkin-Elmer Lambda 2S UV/VIS spectrophotometer. The spectral strength of the ink was measured as 1193 milliliters•Absorbance unit per gram at $\lambda_{max}$. This ink was printed on papers using a PHASER 840 printer, which uses an indirect printing process.

EXAMPLE IX

The process of Example VIII is repeated except that the triamides from Examples I, III, IV, V, VI, and VII are used instead of the triamide from Example II. It is believed that similar results will be obtained.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising (a) a colorant and (b) a carrier comprising a polyamide, wherein the polyamide component of the carrier contains at least about 10 percent by weight of a branched triamide.

2. A phase change ink composition according to claim 1 wherein the polyamide component of the carrier contains at least about 60 percent by weight of a branched triamide.

3. A phase change ink composition according to claim 1 wherein the polyamide component of the carrier contains at least about 90 percent by weight of a branched triamide.

4. A phase change ink composition according to claim 1 wherein the polyamide component of the carrier contains about 100 percent by weight of a branched triamide.

5. A phase change ink composition according to claim 1 wherein the triamide is of the formula

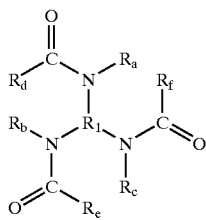

wherein $R_1$ is (i) an alkylene group, (ii) an arylene group, (iii) an arylalkylene group, or (iv) an alkylarylene group, $R_a$, $R_b$, and $R_c$ each, independently of the others, is (i) a hydrogen atom, (ii) an alkyl group, (iii) an aryl group, (iv) an arylalkyl group, or (v) an alkylaryl group, and $R_d$, $R_e$, and $R_f$ each, independently of the others, is (i) an alkyl group, (ii) an aryl group, (iii) an arylalkyl group, or (iv) an alkylaryl group.

6. A phase change ink composition according to claim 5 wherein each amide group of the triamide is bonded to a different atom in the $R_1$ group.

7. A phase change ink composition according to claim 5 wherein the total number of carbon atoms in $R_1+R_a+R_b+R_c+R_d+R_e+R_f$ is at least about 7.

8. A phase change ink composition according to claim 5 wherein the total number of carbon atoms in $R_1+R_a+R_b+R_c+R_d+R_e+R_f$ is at least about 10.

9. A phase change ink composition according to claim 5 wherein the total number of carbon atoms in $R_1+R_a+R_b+R_c+R_d+R_e+R_f$ is at least about 12.

10. A phase change ink composition according to claim 5 wherein the total number of carbon atoms in $R_1+R_a+R_b+R_c+R_d+R_e+R_f$ is no more than about 500.

11. A phase change ink composition according to claim 5 wherein the total number of carbon atoms in $R_1+R_a+R_b+R_c+R_d+R_e+R_f$ is no more than about 350.

12. A phase change ink composition according to claim 5 wherein the total number of carbon atoms in $R_1+R_a+R_b+R_c+R_d+R_e+R_f$ is no more than about 300.

13. A phase change ink composition according to claim 1 wherein the triamide is of the formula

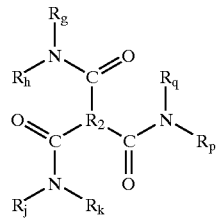

wherein $R_2$ is (i) an alkylene group, (ii) an arylene group, (iii) an arylalkylene group, or (iv) an alkylarylene group, $R_g$, $R_j$, and $R_p$ each, independently of the others, is (i) a hydrogen atom, (ii) an alkyl group, (iii) an aryl group, (iv) an arylalkyl group, or (v) an alkylaryl group, and $R_h$, $R_k$, and $R_q$ each, independently of the others, is (i) a hydrogen atom, (ii) an alkyl group, (iii) an aryl group, (iv) an arylalkyl group, or (v) an alkylaryl group.

14. A phase change ink composition according to claim 13 wherein each amide group of the triamide is bonded to a different atom in the $R_2$ group.

15. A phase change ink composition according to claim 13 wherein the total number of carbon atoms in $R_2+R_g+R_h+R_j+R_k+R_p+R_q$ is at least about 7.

16. A phase change ink composition according to claim 13 wherein the total number of carbon atoms in $R_2+R_g+R_h+R_j+R_k+R_p+R_q$ is at least about 10.

17. A phase change ink composition according to claim 13 wherein the total number of carbon atoms in $R_2+R_g+R_h+R_j+R_k+R_p+R_q$ is at least about 12.

18. A phase change ink composition according to claim 13 wherein the total number of carbon atoms in $R_2+R_g+R_h+R_j+R_k+R_p+R_q$ is no more than about 500.

19. A phase change ink composition according to claim 13 wherein the total number of carbon atoms in $R_2+R_g+R_h+R_j+R_k+R_p+R_q$ is no more than about 350.

20. A phase change ink composition according to claim 13 wherein the total number of carbon atoms in $R_2+R_g+R_h+R_j+R_k+R_p+R_q$ is no more than about 300.

21. A phase change ink composition according to claim 1 wherein the triamide is of the formula

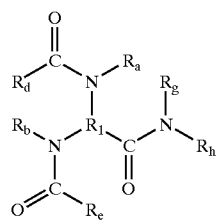

wherein $R_1$ is (i) an alkylene group, (ii) an arylene group, (iii) an arylalkylene group, or (iv) an alkylarylene group, $R_d$ and $R_e$ each, independently of the others, is (i) an alkyl group, (ii) an aryl group, (iii) an arylalkyl group, or (iv) an alkylaryl group, and $R_a$, $R_b$, $R_g$, and $R_h$ each, independently of the others, is (i) a hydrogen atom, (ii) an alkyl group, (iii) an aryl group, (iv) an arylalkyl group, or (v) an alkylaryl group.

22. A phase change ink composition according to claim 21 wherein each amide group of the triamide is bonded to a different atom in the $R_1$ group.

23. A phase change ink composition according to claim 21 wherein the total number of carbon atoms in $R_1+R_a+R_b+R_d+R_e+R_g+R_h$ is at least about 7.

24. A phase change ink composition according to claim 21 wherein the total number of carbon atoms in $R_1+R_a+R_b+R_d+R_e+R_g+R_h$ is at least about 10.

25. A phase change ink composition according to claim 21 wherein the total number of carbon atoms in $R_1+R_a+R_b+R_d+R_e+R_g+R_h$ is at least about 12.

26. A phase change ink composition according to claim 21 wherein the total number of carbon atoms in $R_1+R_a+R_b+R_d+R_e+R_g+R_h$ is no more than about 500.

27. A phase change ink composition according to claim 21 wherein the total number of carbon atoms in $R_1+R_a+R_b+R_d+R_e+R_g+R_h$ is no more than about 350.

28. A phase change ink composition according to claim 21 wherein the total number of carbon atoms in $R_1+R_a+R_b+R_d+R_e+R_g+R_h$ is no more than about 300.

29. A phase change ink composition according to claim 1 wherein the triamide is of the formula

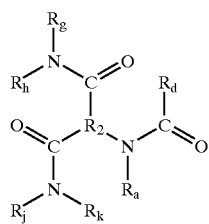

wherein $R_2$ is (i) an alkylene group, (ii) an arylene group, (iii) an arylalkylene group, or (iv) an alkylarylene group, $R_d$ is (i) an alkyl group, (ii) an aryl group, (iii) an arylalkyl group, or (iv) an alkylaryl group, and $R_a$, $R_g$, $R_h$, $R_j$, and $R_k$ each, independently of the others, is (i) a hydrogen atom, (ii) an alkyl group, (iii) an aryl group, (iv) an arylalkyl group, or (v) an alkylaryl group.

30. A phase change ink composition according to claim 29 wherein each amide group of the triamide is bonded to a different atom in the $R_2$ group.

31. A phase change ink composition according to claim 29 wherein the total number of carbon atoms in $R_2+R_a+R_d+R_g+R_h+R_j+R_k$ is at least about 7.

32. A phase change ink composition according to claim 29 wherein the total number of carbon atoms in $R_2+R_a+R_d+R_g+R_h+R_j+R_k$ is at least about 10.

33. A phase change ink composition according to claim 29 wherein the total number of carbon atoms in $R_2+R_a+R_d+R_g+R_h+R_j+R_k$ is at least about 12.

34. A phase change ink composition according to claim 29 wherein the total number of carbon atoms in $R_2+R_a+R_d+R_g+R_h+R_j+R_k$ is no more than about 500.

35. A phase change ink composition according to claim 29 wherein the total number of carbon atoms in $R_2+R_a+R_d+R_g+R_h+R_j+R_k$ is no more than about 350.

36. A phase change ink composition according to claim 29 wherein the total number of carbon atoms in $R_2+R_a+R_d+R_g+R_h+R_j+R_k$ is no more than about 300.

37. A phase change ink composition according to claim 1 wherein the triamide is (a) of the formula

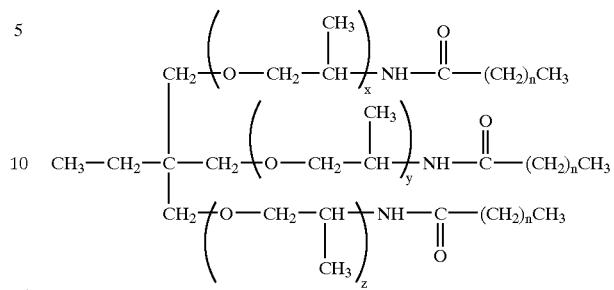

wherein x, y, and z are each integers representing the number of repeat propyleneoxy units, wherein x, y, and z may each be zero, and wherein the sum of x+y+z is from about 5 to about 6, and wherein n has an average value of about 46 and a range of from about 40 to about 52; (b) of the formula

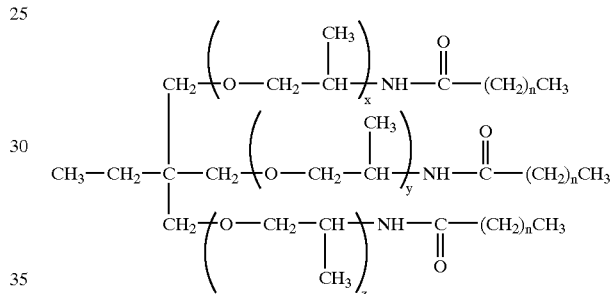

wherein x, y, and z are each integers representing the number of repeat propyleneoxy units, wherein x, y, and z may each be zero, and wherein the sum of x+y+z is from about 5 to about 6, and wherein n has an average value of about 37 and a range of from about 34 to about 40; (c) of the formula

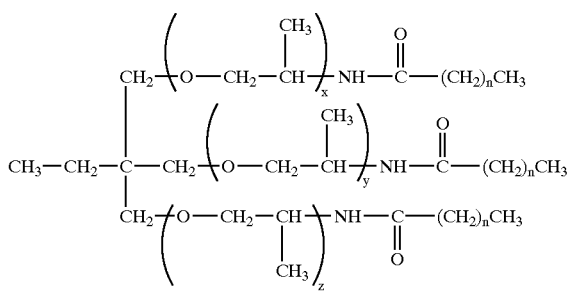

wherein x, y, and z are each integers representing the number of repeat propyleneoxy units, wherein x, y, and z may each be zero, and wherein the sum of x+y+z is from about 5 to about 6, and wherein n has an average value of about 23 and a range of from about 20 to about 26; (d) of the formula

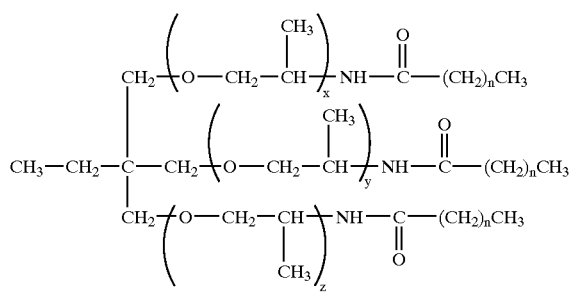

wherein x, y, and z are each integers representing the number of repeat propyleneoxy units, wherein x, y, and z may each be zero, and wherein the sum of x+y+z is from about 5 to about 6, and wherein n is 16; (e) of the formula $N(CH_2CH_2-NH-C(=O)-(CH_2)_{46}CH_3)_3$;

or (f) of the formula $N(CH_2CH_2-NH-C(=O)-(CH_2)_nCH_3)_3$ wherein n has an average value of about 23 and a range of from about 20 to about 26.

38. A phase change ink composition comprising (a) a colorant and (b) a phase change ink carrier comprising a polyamide, wherein the polyamide component of the carrier contains at least about 10 percent by weight of a branched triamide which is the reaction product of either (i) a mixture consisting essentially of at least one monoacid, at least one branched triamine, and optional ingredients nonreactive with the monoacid, the triamine, and the reaction product thereof, or (ii) a mixture consisting essentially of at least one monoamine, at least one branched triacid, and optional ingredients nonreactive with the triacid, the monoamine, and the reaction product thereof.

39. A phase change ink composition comprising (a) a colorant and (b) a phase change ink carrier comprising a polyamide, wherein the polyamide component of the carrier contains at least about 10 percent by weight of a branched triamide which is the reaction product of either (i) a mixture comprising at least one branched triamine and at least one monoacid present in an amount of at least about 3 moles of monoacid per every one mole of branched triamine, or (b) a mixture comprising at least one branched triacid and at least one monoamine present in an amount of at least about 2.5 moles of monoamine per every one mole of branched triacid.

40. A phase change ink composition according to claim 39 wherein the branched triamide is the reaction product of a mixture comprising at least one branched triamine and at least one monoacid present in an amount of at least about 3.1 moles of monoacid per every one mole of branched triamine.

41. A phase change ink composition according to claim 39 wherein the branched triamide is the reaction product of a mixture comprising at least one branched triamine and at least one monoacid present in an amount of at least about 4 moles of monoacid per every one mole of branched triamine.

42. A phase change ink composition according to claim 39 wherein the branched triamide is the reaction product of a mixture comprising at least one branched triacid and at least one monoamine present in an amount of at least about 2.9 moles of monoamine per every one mole of branched triacid.

43. A phase change ink composition according to claim 39 wherein the branched triamide is the reaction product of a mixture comprising at least one branched triacid and at least one monoamine present in an amount of at least about 3 moles of monoamine per every one mole of branched triacid.

44. A process which comprises incorporating a phase change ink according to claim 1 into an ink jet printing apparatus, melting the ink, and causing droplets of the melted ink to be ejected in an imagewise pattern onto a recording substrate.

45. A process according to claim 44 wherein the substrate is a final recording sheet and droplets of the melted ink are ejected in an imagewise pattern directly onto the final recording sheet.

46. A process according to claim 44 wherein the substrate is an intermediate transfer member and droplets of the melted ink are ejected in an imagewise pattern onto the intermediate transfer member followed by transfer of the imagewise pattern from the intermediate transfer member to a final recording sheet.

47. A process according to claim 46 wherein the intermediate transfer member is heated to a temperature above that of the final recording sheet and below that of the melted ink in the printing apparatus.

48. A process according to claim 44 wherein the printing apparatus employs a piezoelectric ink jet process, wherein droplets of the ink are caused to be ejected in imagewise pattern by oscillations of piezoelectric vibrating elements.

* * * * *